(12) United States Patent
Fabian et al.

(10) Patent No.: US 10,175,436 B2
(45) Date of Patent: Jan. 8, 2019

(54) OPTICAL FIBER RIBBONS AND RIBBON MATRIX MATERIALS HAVING LOW OLIGOMER CONTENT

(71) Applicant: Corning Optical Communications LLC, Hickory, NC (US)

(72) Inventors: Michelle Dawn Fabian, Horseheads, NY (US); Kevin Robert McCarthy, Horseheads, NY (US)

(73) Assignee: Corning Optical Communications LLC, Hickory, NC (US)

( * ) Notice: Subject to any disclaimer, the term of this patent is extended or adjusted under 35 U.S.C. 154(b) by 0 days.

(21) Appl. No.: 15/183,106

(22) Filed: Jun. 15, 2016

(65) Prior Publication Data

US 2016/0299305 A1   Oct. 13, 2016

Related U.S. Application Data

(60) Division of application No. 13/349,172, filed on Jan. 12, 2012, which is a continuation of application No. PCT/US2010/040314, filed on Jun. 29, 2010.

(60) Provisional application No. 61/226,334, filed on Jul. 17, 2009.

(51) Int. Cl.
*G02B 6/44* (2006.01)
*C08F 222/20* (2006.01)

(52) U.S. Cl.
CPC .......... *G02B 6/4403* (2013.01); *C08F 222/20* (2013.01); *G02B 6/4495* (2013.01); *C08F 2222/205* (2013.01)

(58) Field of Classification Search
CPC ........................... G02B 6/02395; G02B 6/443
See application file for complete search history.

(56) References Cited

U.S. PATENT DOCUMENTS

| | | | |
|---|---|---|---|
| 4,608,409 | A | 8/1986 | Coady et al. |
| 4,609,718 | A | 9/1986 | Bishop et al. |

(Continued)

FOREIGN PATENT DOCUMENTS

| | | |
|---|---|---|
| CN | 1447845 A | 10/2003 |
| CN | 1644637 A | 7/2005 |

(Continued)

OTHER PUBLICATIONS

Patent Cooperation Treaty International Search Report and Written Opinion for International Application No. PCT/US2010/040314; dated Nov. 25, 2010—14 pages.

(Continued)

*Primary Examiner* — Sung Pak
*Assistant Examiner* — Hoang Tran
(74) *Attorney, Agent, or Firm* — William D. Doyle (57) ABSTRACT

An optical fiber ribbon includes a plurality of optical fibers and a ribbon matrix having an inner matrix surrounding and encapsulating the optical fibers, wherein the inner matrix is the cured product of an inner matrix composition substantially free of oligomer components, and an outer matrix surrounding the inner matrix, wherein the outer matrix is the cured product of an outer matrix composition substantially free of oligomer components.

7 Claims, 4 Drawing Sheets

(56) References Cited

U.S. PATENT DOCUMENTS

| | | | |
|---|---|---|---|
| 4,962,992 | A | 10/1990 | Chapin et al. |
| 5,104,433 | A | 4/1992 | Chapin et al. |
| 6,334,016 | B1 | 12/2001 | Greer |
| 6,337,941 | B1 | 1/2002 | Yang et al. |
| 6,362,249 | B2 | 3/2002 | Chawla |
| 6,438,306 | B1 | 8/2002 | Bishop et al. |
| 6,455,607 | B1 | 9/2002 | Shustack |
| 6,714,712 | B2 * | 3/2004 | Bishop .................... C07C 67/60 385/123 |
| 6,775,451 | B1 * | 8/2004 | Botelho ................ C03C 25/106 385/128 |
| 6,797,740 | B2 | 9/2004 | Abel et al. |
| 7,257,299 | B2 | 8/2007 | Chien et al. |
| 7,289,706 | B2 | 10/2007 | Chien et al. |
| 2003/0077059 | A1 | 4/2003 | Chien et al. |
| 2004/0062501 | A1 | 4/2004 | Abel et al. |

FOREIGN PATENT DOCUMENTS

| | | |
|---|---|---|
| EP | 1263823 B1 | 1/2007 |
| WO | 199850317 A1 | 11/1998 |
| WO | 2007064725 A2 | 6/2007 |

OTHER PUBLICATIONS

Lesser, A. J. & Calzia, K. J., 2004, "Molecular Parameters Governing the Yield Response of Epoxy-Based Glassy Networks," Journal of Polymer Science: Part B: Polymer Physics, 42(11), pp. 2050-2056.

Robertson, R. E., 1966, "Theory for the Plasticity of Glassy Polymers," The Journal of Chemical Physics, 44(10), pp. 3950-3956.

Kody, R. S. & Lesser, A. J., 1997, "Deformation and yield of epoxy networks in constrained states of stress," Journal of Materials Science, 32, pp. 5637-5643.

Lesser, A. J. & Kody, R. S., 1997, "A Generalized Model for the Yield Behavior of Epoxy Networks in Multiaxial Stress States," Journal of Polymer Science: Part B: Polymer Physics, 35, pp. 1611-1619.

Crawford, E. & Lesser, A. J., 1998, "The Effect of Network Architecture on the Thermal and Mechanical Behavior of Epoxy Resins," Journal of Polymer Science: Part B: Polymer Physics, 36, pp. 1371-1382.

IN463/DELNP/2012 Office Action dated Sep. 20, 2017, India Patent Office.

* cited by examiner

OPTICAL FIBER RIBBONS AND RIBBON MATRIX MATERIALS HAVING LOW OLIGOMER CONTENT

PRIORITY APPLICATION

This application is a divisional of U.S. patent application Ser. No. 13/349,172, which is a continuation of International Application No. PCT/US10/40314 filed Jun. 29, 2010, which claims the benefit of priority to U.S. Provisional Patent Application No. 61/226,334, filed Jul. 17, 2009, the contents of each of which are relied upon and incorporated herein by reference in their entirety.

TECHNICAL FIELD

The present disclosure relates to compositions for fiber optic ribbon matrix materials and fiber optic ribbons that contain a matrix prepared from such compositions.

BACKGROUND

Optical fibers have acquired an increasingly important role in field of communications, frequently replacing existing copper wires. This trend has a significant impact in local area networks (i.e., for fiber-to-home uses), which has seen a vast increase in the usage of optical fibers. Further increases in the use of optical fibers in local loop telephone and cable TV service are expected, as local fiber networks are established to deliver ever greater volumes of information in the form of data, audio, and video signals to residential and commercial users. In addition, use of optical fibers in home and commercial business environments for internal data, voice, and video communications is expected to increase.

Optical fibers are often bundled together to form a product known as an optical fiber ribbon. The ribbon includes optical fibers that have been encased or encapsulated in a polymeric matrix material to secure the fibers in a parallel arrangement. The matrix portion of the optical fiber ribbon can include one or more layers of the polymeric matrix material, and each optical fiber typically contains a dual layer coating system that includes a soft, inner polymer coating and a hard, protective outer polymer coating. Prior to forming the ribbon, the optical fibers may also be coated with a thin colored layer of marking ink (i.e., in a polymer base) for purposes of fiber identification within the ribbon.

While the most basic function of the matrix materials is to secure the individual optical fibers or ribbon sub-units in a planar array, they also contribute to the handling properties of the ribbon. Two important handling attributes of the optical fiber ribbon are peel and breakout performance. Peel is the removal of matrix material from the optical fibers in the mid-span region of the optical fiber ribbon. It is desirable, for example, to be able to peel the matrix layers cleanly off the optical fibers without removing any of the colored marking ink layers. In addition, the matrix layers should be removable as an intact unit without breaking apart and leaving residue on the optical fibers. Breakout occurs at the ends of the ribbons and is used to provide access to individual fibers in the ribbon. As with peel, it is desirable to be able to remove the matrix material during breakout without it breaking apart and leaving residue on the optical fibers.

In general, the matrix material must be tough enough such that the matrix does not easily break apart during breakout and peel. Greer (U.S. Pat. No. 6,334,016) teaches that the matrix material must exhibit sufficient toughness such that the matrix material does not easily break apart when removed from the optical fiber ribbon. Greer further teaches that the matrix materials typically comprise an acrylated urethane oligomer. This is because the hydrogen bonding associated with the urethane linkages contributes to enhanced toughness. Shustack (U.S. Pat. No. 6,455,607) also describes matrix materials having acrylated urethane oligomers. However, urethane acrylate oligomers are high cost components in UV-curable acrylate formulations. The cost savings associated with reducing or eliminating oligomer use in matrix formulations is desirable, however the resultant matrix material must maintain good breakout, peel, and other performance characteristics required of ribbon matrix materials.

SUMMARY

According to one embodiment of the invention, fiber ribbons exhibit improved peel and breakout performance using monomeric components as the major constituent of the ribbon matrix materials, substantially reducing or eliminating the use of oligomers such as expensive urethane acrylate oligomers.

According to one aspect, inner and outer matrix materials are comprised substantially of Bisphenol A diacrylate monomers.

It is to be understood that both the foregoing general description and the following detailed description present embodiments of the invention, and are intended to provide an overview or framework for understanding the nature and character of the invention as it is claimed.

BRIEF DESCRIPTION OF THE FIGURES

The present embodiments are explained in more detail below with reference to the figures which show the exemplary embodiments.

DETAILED DESCRIPTION

The present embodiments relate to optical fiber ribbons and methods of making such ribbons at relatively low cost while maintaining good ribbon matrix breakout and peel performance. Because of substantial cost savings in substantially reducing or eliminating the oligomer content of optical fiber ribbon matrix compositions, the major constituents of the compositions of the present embodiments are monomeric components. This is contrary to most conventional matrix compositions, which contain a urethane acrylate oligomeric component as the major constituent and a monomeric component as the minor constituent. In most conventional coating and/or matrix compositions, an oligomeric component functions as the backbone upon which polymerization occurs, while the monomeric component functions as a diluent for controlling the viscosity of the composition and, during curing, as a cross-linking agent (depending upon the number of functional groups a particular monomeric constituent may have).

As used in this specification, the "weight percent" of a particular component refers to the amount introduced into the bulk composition, excluding other additives. The amount of other additives that are introduced into the bulk composition to produce a composition of the present invention is listed in parts per hundred. For example, an oligomer, monomer, and photoinitiator are combined to form the bulk composition such that the total weight percent of these components equals 100 percent. To this bulk composition, an amount of an additive, for example 1.0 part per hundred of an antioxidant, is introduced in excess of the 100 weight percent of the bulk composition.

Suitable polyfunctional ethylenically unsaturated monomers include, without limitation, alkoxylated bisphenol A diacrylates such as ethoxylated bisphenol A diacrylate with ethoxylation being 2 or greater, preferably ranging from 2 to about 30 (e.g. SR349 and SR601 available from Sartomer Company, Inc. West Chester, Pa. and Photomer 4025 and Photomer 4028, available from Cognis Corp. (Ambler, Pa.)), and propoxylated bisphenol A diacrylate with propoxylation being 2 or greater, preferably ranging from 2 to about 30; methylolpropane polyacrylates with and without alkoxylation such as ethoxylated trimethylolpropane triacrylate with ethoxylation being 3 or greater, preferably ranging from 3 to about 30 (e.g., Photomer 4149, Cognis Corp., and SR499, Sartomer, Inc.), propoxylated-trimethylolpropane triacrylate with propoxylation being 3 or greater, preferably ranging from 3 to 30 (e.g., Photomer 4072, Cognis Corp: and SR492, Sartomer), and ditrimethylolpropane tetraacrylate (e.g., Photomer 4355, Cognis Corp.); alkoxylated glyceryl triacrylates such as propoxylated glyceryl triacrylate with propoxylation being 3 or greater (e.g., Photomer 4096, Cognis Corp. and SR9020, Sartomer); erythritol polyacrylates with and without alkoxylation, such as pentaerythritol tetraacrylate (e.g., SR295, available from Sartomer Company, Inc. (West Chester, Pa.)), ethoxylated pentaerythritol tetraacrylate (e.g., SR494, Sartomer Company, Inc.), and dipentaerythritol pentaacrylate (e.g., Photomer 4399, Cognis Corp., and SR399, Sartomer Company, Inc.); isocyanurate polyacrylates formed by reacting an appropriate functional isocyanurate with an acrylic acid or acryloyl chloride, such as tris-(2-hydroxyethyl) isocyanurate triacrylate (e.g., SR368, Sartomer Company, Inc.) and tris-(2-hydroxyethyl) isocyanurate diacrylate; alcohol polyacrylates with and without alkoxylation such as tricyclodecane dimethanol diacrylate (e.g., CD406, Sartomer Company, Inc.) and ethoxylated polyethylene glycol diacrylate with ethoxylation being 2 or greater, preferably ranging from about 2 to 30; epoxy acrylates formed by adding acrylate to bisphenol A diglycidylether (4 up) and the like (e.g., Photomer 3016, Cognis Corp.); and single and multi-ring cyclic aromatic or non-aromatic polyacrylates such as dicyclopentadiene diacrylate and dicyclopentane diacrylate.

It may also be desirable to use certain amounts of monofunctional ethylenically unsaturated monomers, which can be introduced to influence the degree to which the cured product absorbs water, adheres to other coating materials, or behaves under stress. Exemplary monofunctional ethylenically unsaturated monomers include, without limitation, hydroxyalkyl acrylates such as 2-hydroxyethyl-acrylate, 2-hydroxypropyl-acrylate, and 2-hydroxybutyl-acrylate; long- and short-chain alkyl acrylates such as methyl acrylate, ethyl acrylate, propyl acrylate, isopropyl acrylate, butyl acrylate, amyl acrylate, isobutyl acrylate, t-butyl acrylate, pentyl acrylate, isoamyl acrylate, hexyl acrylate, heptyl acrylate, octyl acrylate, isooctyl acrylate, 2-ethylhexyl acrylate, nonyl acrylate, decyl acrylate, isodecyl acrylate, undecyl acrylate, dodecyl acrylate, lauryl acrylate, octadecyl acrylate, and stearyl acrylate; aminoalkyl acrylates such as dimethylaminoethyl acrylate, diethylaminoethyl acrylate, and 7-amino-3,7-dimethyloctyl acrylate; alkoxyalkyl acrylates such as butoxyethyl acrylate, phenoxyethyl acrylate (e.g., SR339, Sartomer Company, Inc.), and ethoxyethoxyethyl acrylate; single and multi-ring cyclic aromatic or non-aromatic acrylates such as cyclohexyl acrylate, benzyl acrylate, dicyclopentadiene acrylate, dicyclopentanyl acrylate, tricyclodecanyl acrylate, bornyl acrylate, isobornyl acrylate (e.g., SR423, Sartomer Company, Inc.), tetrahydrofurfuryl acrylate (e.g., SR285, Sartomer Company, Inc.), caprolactone acrylate (e.g., SR495, Sartomer Company, Inc.), and acryloylmorpholine; alcohol-based acrylates such as polyethylene glycol monoacrylate, polypropylene glycol monoacrylate, methoxyethylene glycol acrylate, methoxypolypropylene glycol acrylate, methoxypolyethylene glycol acrylate, ethoxydiethylene glycol acrylate, and various alkoxylated alkylphenol acrylates such as ethoxylated(4) nonylphenol acrylate (e.g., Photomer 4003, Cognis Corp.); acrylamides such as diacetone acrylamide, isobutoxymethyl acrylamide, N,N'-dimethyl-aminopropyl acrylamide, N,N-dimethyl acrylamide, N,N diethyl acrylamide, and t-octyl acrylamide; vinylic compounds such as N-vinylpyrrolidone and N-vinylcaprolactam; and acid esters such as maleic acid ester and fumaric acid ester. With respect to the long and short chain alkyl acrylates listed above, a short chain alkyl acrylate is an alkyl group with 6 or less carbons and a long chain alkyl acrylate is alkyl group with 7 or more carbons.

Most suitable monomers are either commercially available or readily synthesized using reaction schemes known in the art. For example, most of the above-listed monofunctional monomers can be synthesized by reacting an appropriate alcohol or amide with an acrylic acid or acryloyl chloride.

Preferably, the composition is devoid of an oligomeric component and the monomeric component is a combination of two or more monomers. The term oligomer is defined as the class of compounds including aliphatic and aromatic urethane (meth)acrylate oligomers, urea (meth)acrylate oligomers, polyester and polyether (meth)acrylate oligomers, acrylated acrylic oligomers, polybutadiene (meth)acrylate oligomers, polycarbonate (meth)acrylate oligomers, and melamine (meth)acrylate oligomers.

When employed, suitable oligomers can be either monofunctional oligomers or polyfunctional oligomers, although polyfunctional oligomers are preferred. The oligomeric component can also be a combination of a monofunctional oligomer and a polyfunctional oligomer.

Di-functional oligomers preferably have a structure according to formula (I) below:

$$F_1-R_1-[\text{Diisocyanate}-R_2-\text{Diisocyanate}]_m-R_1-F_1 \qquad (I)$$

where $F_1$ is independently a reactive functional group such as acrylate, methacrylate, acrylamide, N-vinyl amide, styrene, vinyl ether, vinyl ester, or other functional group known in the art; $R_1$ includes, independently, $-C_{2-12}-$, $-(C_{2-4}-O)_n-$, $-C_{2-12}O-(C_{2-4}-O)_n-$, $-C_{2-12}O-(CO-C_{2-5}O)_n-$, or $-C_{2-12}O-(CO-C_{2-5}NH)_n-$ where n is a whole number from 1 to 30, preferably 1 to 10; $R_2$ is polyether, polyester, polycarbonate, polyamide, polyurethane, polyurea, or combinations thereof; and m is a whole number from 1 to 10, preferably 1 to 5. In the structure of formula I, the diisocyanate group is the reaction product formed following bonding of a diisocyanate to $R_2$ and/or $R_1$.

The term "independently" is used herein to indicate that each $F_1$ may differ from another $F_1$ and the same is true for each $R_1$.

Other polyfunctional oligomers preferably have a structure according to formula (II), formula (III), or formula (IV) as set forth below:

$$\text{multiisocyanate-}(_2\text{-}R_1\text{---}F_2)_x \quad \text{(II)}$$

$$\text{polyol-[(diisocyanate-}R_2\text{-diisocyanate)}_m\text{---}R_1\text{---}F_2]_x \quad \text{(III)}$$

or $$\text{multiisocyanate-}(R_1\text{---}F_2)_x \quad \text{(IV)}$$

where $F_2$ independently represents from 1 to 3 functional groups such as acrylate, methacrylate, acrylamide, N-vinyl amide, styrene, vinyl ether, vinyl ester, or other functional groups known in the art; $R_1$ can include $-C_{2-12}O-$, $-(C_{2-4}-O)_n-$, $-C_{2-12}O-(C_{2-4}-O)_n-$, $-C_{2-12}O-(CO-C_{2-5}O)_n-$, or $-C_{2-12}O-(CO-C_{2-5}NH)_n-$ where n is a whole number from 1 to 10, preferably 1 to 5; $R_2$ can be polyether, polyester, polycarbonate, polyamide, polyurethane, polyurea or combinations thereof; x is a whole number from 1 to 10, preferably 2 to 5; and m is a whole number from 1 to 10, preferably 1 to 5. In the structure of formula II, the multiisocyanate group is the reaction product formed following bonding of a multiisocyanate to $R_2$. Similarly, the diisocyanate group in the structure of formula III is the reaction product formed following bonding of a diisocyanate to $R_2$ and/or $R_1$.

Urethane oligomers are conventionally provided by reacting an aliphatic or aromatic diisocyanate with a dihydric polyether or polyester, most typically a polyoxyalkylene glycol such as a polyethylene glycol. Such oligomers typically have between about four to about ten urethane groups and may be of high molecular weight, e.g., 2000-8000. However, lower molecular weight oligomers, having molecular weights in the 500-2000 range, may also be used. U.S. Pat. No. 4,608,409 to Coady et al. and U.S. Pat. No. 4,609,718 to Bishop et al., which are hereby incorporated by reference, describe such syntheses in detail.

When it is desirable to employ moisture-resistant oligomers, they may be synthesized in an analogous manner, except that the polar polyether or polyester glycols are avoided in favor of predominantly saturated and predominantly non-polar aliphatic diols. These diols include, for example, alkane or alkylene diols of from about 2-250 carbon atoms and, preferably, are substantially free of ether or ester groups.

As is well known, polyurea components may be incorporated in oligomers prepared by these methods, simply by substituting diamines or polyamines for diols or polyols in the course of synthesis. The presence of minor proportions of polyurea components in the present coating systems is not considered detrimental to coating performance, provided only that the diamines or polyamines employed in the synthesis are sufficiently non-polar and saturated as to avoid compromising the moisture resistance of the system.

As is well known, matrix compositions may also contain a polymerization initiator which is suitable to cause polymerization (i.e., curing) of the composition after its application to secure the optical fibers in a ribbon. Polymerization initiators suitable for use in the compositions of the present invention include thermal initiators, chemical initiators, electron beam initiators, microwave initiators, actinic-radiation initiators, and photoinitiators. Particularly preferred are the photoinitiators. For most acrylate-based coating formulations, conventional photoinitiators, such as the known ketonic photoinitiating and/or phosphine oxide additives, are preferred. When used in the compositions of the present invention, the photoinitiator is present in an amount sufficient to provide rapid ultraviolet curing. Preferably, this includes about 0.5 to about 10 weight percent, more preferably about 1.5 to about 7.5 weight percent, and most preferably about 3 weight percent polymerization initiator.

The photoinitiator, when used in a small but effective amount to promote radiation cure, must provide reasonable cure speed without causing premature gelation of the matrix composition. A desirable cure speed is any speed sufficient to cause substantial curing (i.e., greater than about 90%, more preferably 95%) of the matrix composition.

Suitable photoinitiators include, without limitation, 2,4,6-Trimethylbenzoyldiphenylphosphine oxide (e.g. Lucirin TPO), 1-hydroxycyclohexylphenyl ketone (e.g.,; Irgacure 184 available from Ciba Specialty Chemical (Tarrytown, N.Y.)), (2,6-diethoxybenzoyl)-2,4,4-trimethylpentyl phosphine oxide (e.g. in commercial blends Irgacure 1800, 1850, and 1700, Ciba Specialty Chemical), 2,2-dimethoxyl-2-phenyl acetophenone (e.g., Irgacure,651, Ciba Specialty Chemical), bis(2,4,6-trimethylbenzoyl)phenyl phosphine oxide (e.g., Irgacure 819, Ciba Specialty Chemical), (2,4,6-triiethylbenzoyl)diphenyl phosphine oxide (e.g., in commercial blend Darocur 4265, Ciba Specialty Chemical), 2-hydroxy-2-methyl-1-phenylpropane-1-one (e.g., in commercial blend Darocur 4265, Ciba Specialty Chemical) and combinations thereof. Other photoinitiators are continually being developed and used in matrix compositions. Any suitable photoinitiator can be introduced into compositions of the present invention.

In addition to the above-described components, the matrix composition of the present invention can optionally include an additive or a combination of additives. Suitable additives include, without limitation, antioxidants, catalysts, lubricants, low molecular weight non-crosslinking resins, adhesion promoters, and stabilizers. Some additives can operate to control the polymerization process, thereby affecting the physical properties (e.g., modulus, glass transition temperature) of the polymerization product formed from the composition. Others can affect the integrity of the polymerization product of the composition (e.g., protect against de-polymerization or oxidative degradation).

A preferred antioxidant is thiodiethylene bis(3,5-di-tert-butyl)-4-hydroxyhydrocinnamate (e.g., Irganox 1035, available from Ciba Specialty Chemical).

A preferred adhesion promoter is an acrylated acid adhesion promoter such as Ebecryl 170 (available from UCB Radcure (Smyrna Ga.)).

Other suitable materials for use in matrix materials, as well as considerations related to selection of these materials, are well known in the art and are described in U.S. Pat. Nos. 4,962,992 and 5,104,433 to Chapin, which are hereby incorporated by reference. Various additives that enhance one or more properties of the matrix can also be present, including the above-mentioned additives incorporated in the compositions of the present invention.

Figure 1:
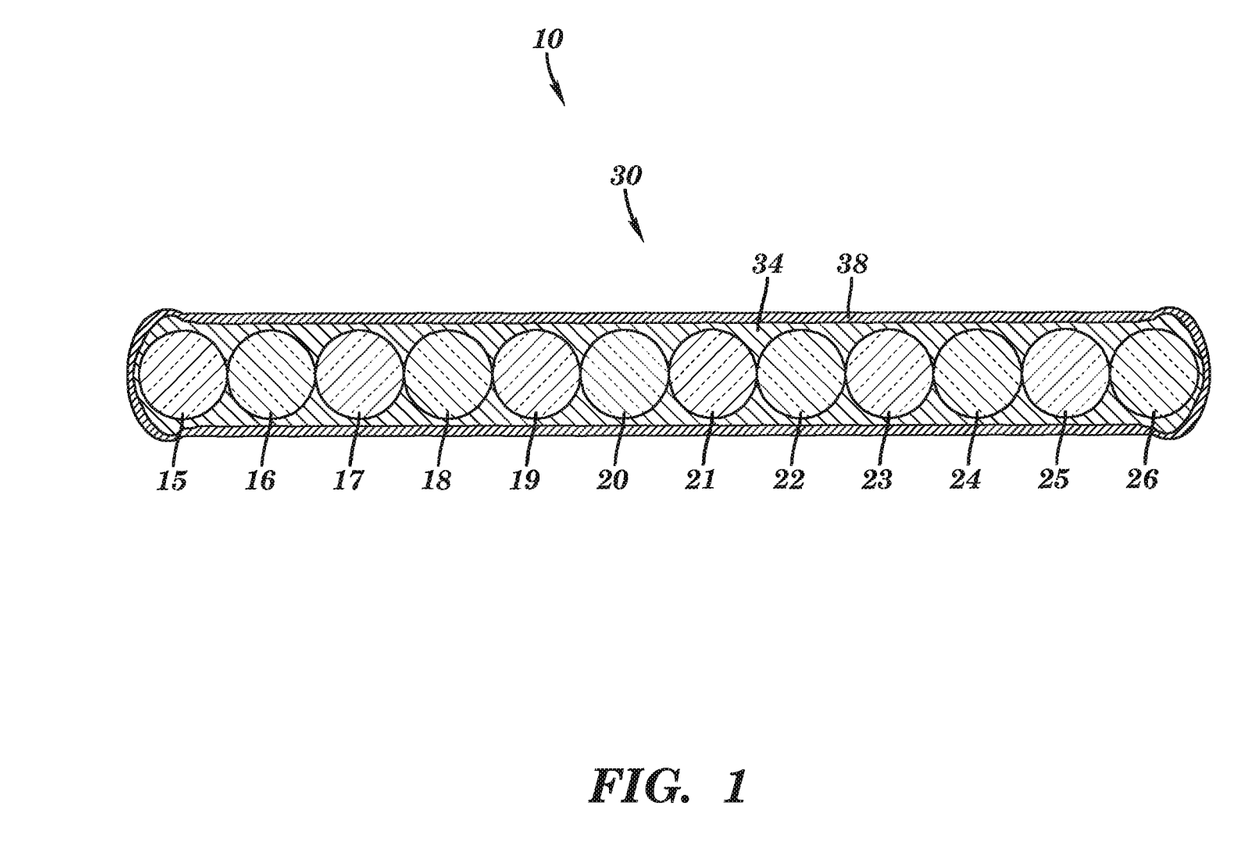
FIG. 1 is a cross-section of an optical fiber ribbon according to an embodiment of the present invention.

FIG. 1 is a cross-section of an optical fiber ribbon 10 incorporating matrix materials according to the present embodiments. The optical fiber ribbon 10 includes a plurality of substantially aligned optical fibers 15-26 that are surrounded by and encapsulated within a ribbon matrix 30. Each of the optical fibers 15-260 includes a glass fiber having one or more coatings (not shown). The ribbon matrix 30 can be either a single layer matrix or a dual layer matrix (formed of inner and outer matrix materials). In the illustrated embodiment, the matrix 30 comprises an inner matrix 34 and an outer matrix 38. The inner matrix 34 surrounds and contacts the optical fibers 20, and the outer matrix 38 surrounds and contacts an outer surface of the inner matrix 34. Each of the optical fibers 15-26 can include an ink layer (not shown) to allow for identification of individual optical fibers 15-26. The exemplary optical fiber ribbon 10 shown in FIG. 1 includes twelve optical fibers 15-26 each having a dual-layer coating. The optical fibers also each include a colored ink coating, with the twelve fibers being provided in a 12-color sequence of, for example, blue 15, orange 16, green 17, brown 18, slate 19, white 20, red 21, black 22, yellow 23, purple 24, rose 25, and aqua 26. Any combination of colors is suitable for use in the present invention.

According to the present embodiments, the matrix 30 comprises UV-curable ribbon matrix materials. In one embodiment, the composition of the inner matrix 34 includes an aggregate oligomeric component present in an amount of about 3 weight percent or less, and a monomeric component or monomeric components present in an aggregate amount of about 80 weight percent or more. The oligomeric components can be, for example, urethane acrylate components or polyester acrylate components, each being present in amount of 3 weight percent or less, in aggregate with other oligomer components or individually. While the monomeric components can be present in an aggregate amount of 80 weight percent or more, they are preferably present in an aggregate amount of about 85 to about 100 weight percent, more preferably about 90 to about 99 weight percent, and most preferably about 95 to about 99 weight percent. After curing, the cured product of the inner matrix 34 composition has a Young's Modulus of at least about 750 MPa. Preferably, the cured product of the inner matrix 34 composition is characterized by a Young's modulus of from about 900 to about 1500 MPa.

In one embodiment, the composition of the outer matrix 38 includes an aggregate oligomeric component present in an amount of about 3 weight percent or less, and a monomeric component or monomeric components present in an aggregate amount of about 80 weight percent or more. The oligomeric components can be, for example, urethane acrylate components or polyester acrylate components, each being present in amount of 3 weight percent or less, in aggregate with other oligomer components or individually. While the monomeric components can be present in an aggregate amount of 80 weight percent or more, they are preferably present in an aggregate amount of about 85 to about 100 weight percent, more preferably about 90 to about 99 weight percent, and most preferably about 95 to about 99 weight percent. After curing, the cured product of the outer matrix 38 composition has a Young's Modulus of at least about 250 MPa Preferably, the cured product of the outer matrix 38 composition is characterized by a Young's modulus of from about 350 to about 750 MPa.

According to the present embodiments, the aggregate oligomer component weight percent can be 2 weight percent or less, 1 weight percent or less, or the oligomer components can be substantially eliminated from one or both of the matrix compositions. For example, according to one embodiment, no urethane acrylate component is present in either the inner or the outer matrix compositions.

Although the matrix 34 is described as an "inner matrix", it may be used without the surrounding outer matrix 38. In such an embodiment, the matrix material has a uniform composition throughout the ribbon. Preferably, the single layer matrix material has the properties of the inner matrix composition noted above.

In the present compositions, the monomeric components of the matrix formulation can include a single monomer or it can be a combination of two or more monomers. Although not required, it is preferable that the monomeric component be a combination of two or more monomers so that the cured physical properties can be adjusted to desired ranges. The monomeric component introduced into the composition of the present invention may include ethylenically unsaturated monomer(s).

Figure 2:
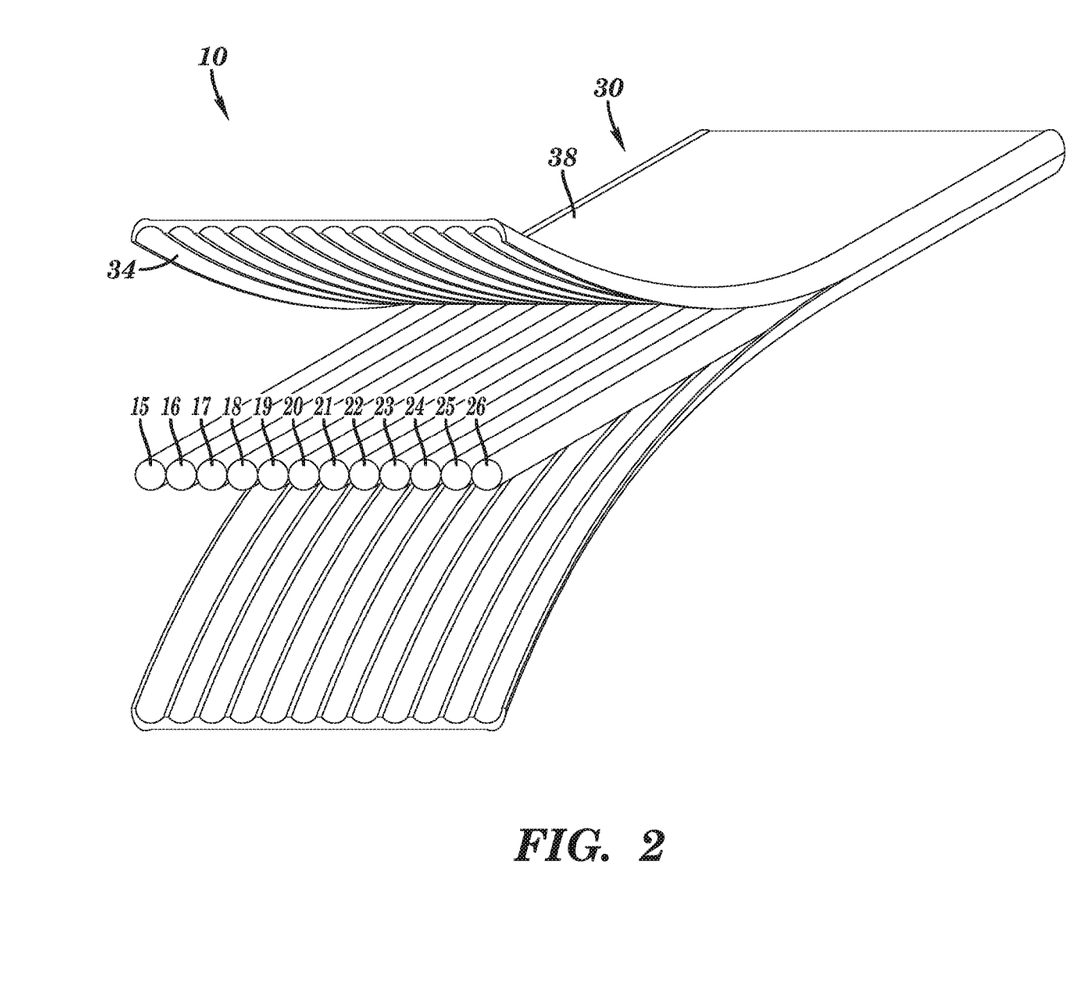
FIG. 2 illustrates an optical fiber ribbon undergoing matrix peel.

FIG. 2 illustrates the optical fiber ribbon 10 undergoing matrix peel. Matrix peel qualities can be evaluated and quantified using a matrix peel test. One procedure for testing peel is as follows: 1. using a roughly 12 inch sample of ribbon 10, hold the top end of the ribbon, blue fiber 15 on the left side, with the thumb and index finger about 1 inch from the end and twist the ribbon end 90° in one direction and then 90° in the other direction—the matrix material 30 should break loose from the fibers 15-26; and 2. grasp the matrix layer 30 on one side of the ribbon and pull down to remove the matrix 30 from the fibers 15-26. Rate the peel according to the scale detailed in Table 1.

TABLE 1

Peel Rating Scale

| Rating | Rating Criteria |
| --- | --- |
| 1 | All ribbon coating peels cleanly. The entire length of the ribbon coating peels with little effort or tension. Little or no matrix is left on the edge fibers of the ribbon. |
| 2 | The ribbon coating breaks or begins to fragment near the bottom end of the ribbon. |
| 3 | The ribbon coating breaks or begins to fragment within the first four inches of the ribbon. |
| 4 | The ribbon coating will not peel from the ribbon. The ribbon coating breaks near the top of the sample or never separates from the ribbon structure. No ribbon coating strip is formed. |

Figure 3:
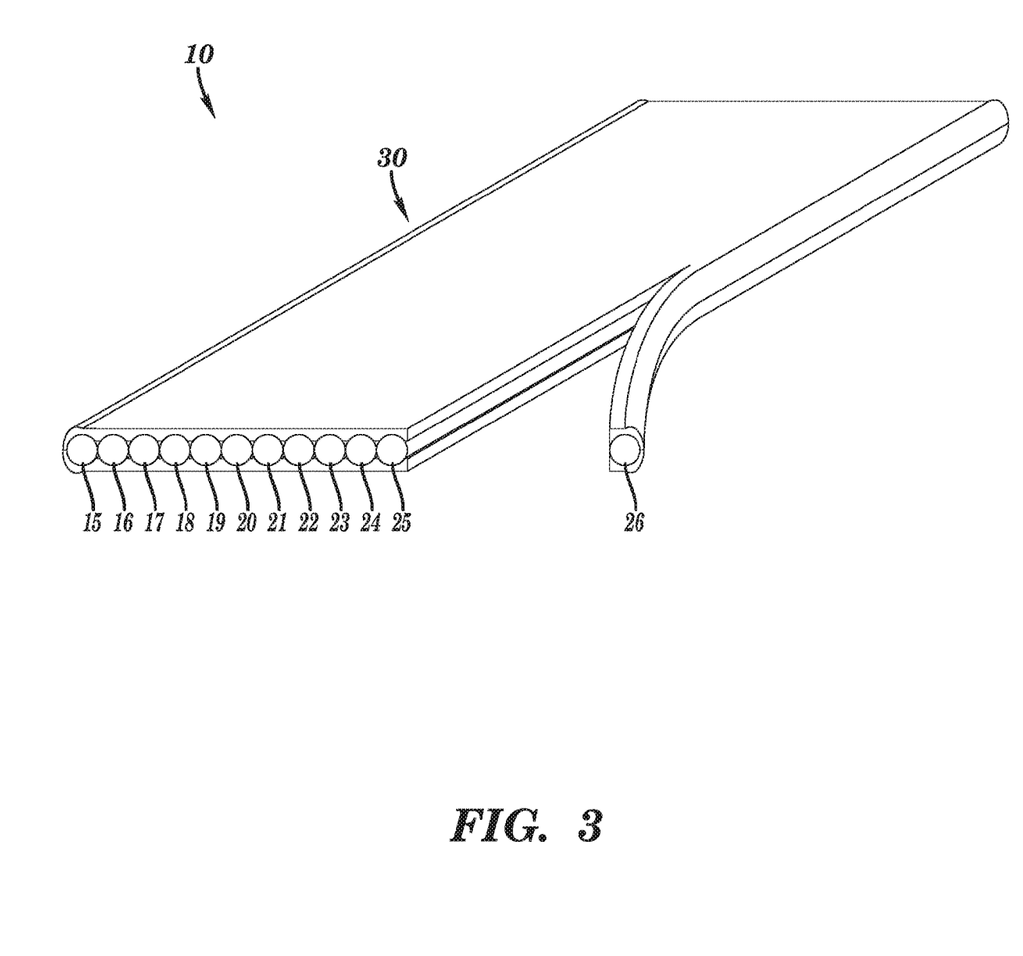
FIG. 3 illustrates an optical fiber ribbon undergoing fiber breakout.

FIG. 3 illustrates the optical fiber ribbon 10 undergoing fiber breakout for the first fiber in a 12 fiber breakout process. Breakout qualities for a 12 fiber ribbon can be evaluated and quantified using the following procedure: 1. using a roughly 18 inch ribbon 10 sample, hold the top end of the ribbon 10, blue fiber 15 on the left side, with the thumb and index finger at about 1-2 inches from the end of the ribbon 10 and twist the ribbon end 90° in one direction and then 90° in the other direction—the matrix material 30 should break loose from the fibers 15-26; 2. remove the aqua fiber 26 and remove any matrix 30 from the aqua fiber 26; and 3. grasp the remaining 11 fibers 15-25 with one hand and hold the matrix 30 with the other hand and attempt to remove the 11 fibers 15-25 all at once. When all the fibers 15-26 have been removed, examine the matrix 30 for damage and rate the 12 fiber breakout performance according to the rating scale detailed in Table 2.

TABLE 2

12 Fiber Breakout Rating Scale

| Rating | Rating Criteria |
| --- | --- |
| 1 | Fibers were easily removed, matrix shell is undamaged. |
| 2 | Fibers were removed without damage to the matrix shell, but the matrix separates into 2 strips. |
| 3 | Fibers were removed from the matrix, but the shell is damaged with several spots where the matrix stuck to the fibers. |

TABLE 2-continued

12 Fiber Breakout Rating Scale

| Rating | Rating Criteria |
|---|---|
| 4 | Fibers were removed from the matrix, but the shell was significantly damaged with lots of areas where the matrix stuck to the fibers, or the matrix is shredded. |
| 5 | Fibers cannot be removed from the matrix. |

Single fiber breakout qualities for a 12 fiber ribbon can be evaluated and quantified using the following procedure: 1. using a roughly 18 inch ribbon 10 sample, hold the top end of the ribbon 10, blue fiber 15 on the left side, with the thumb and index finger at about 1-2 inches from the end and twist the end 90° in one direction and then 90° in the other direction. The matrix material 30 should break loose from the fibers 15-26; 2. remove the aqua fiber 26 and remove any matrix 30 from the aqua fiber 26; and remove the remaining fibers 15-25 one at a time. Rate the overall single fiber breakout of the ribbon 10 according to the rating scale detailed in Table 3.

TABLE 3

Single Fiber Breakout Rating Scale

| Rating | Rating Criteria |
|---|---|
| 1 | Fibers remove easily from matrix and matrix stays in a cohesive shell. |
| 2 | Fibers release from matrix in a jerky fashion, however, matrix forms a cohesive shell. |
| 3 | Fibers remove easily from matrix, but shell separates into two strips. Some flaking of the matrix shell may occur. |
| 4 | Matrix adheres to at least one fiber, other than blue, during breakout. |
| 5 | Cannot remove fiber from the matrix. Color layer is removed or fiber breaks. |

EXAMPLES

According to one aspect of the present embodiments, an optical fiber ribbon, as generally illustrated in FIG. 1, is comprised of matrix materials having advantageous peel and breakout characteristics. Weight percents for components of the inner matrix 34 and the outer matrix 38 materials are summarized in Tables 4 and 5 below.

TABLE 4

Weight Percentages for Matrix Components

| Component | Inner Matrix Example 1 | Outer Matrix Example 1 |
|---|---|---|
| Photomer 3016 Monomer | 35% | 30% |
| Photomer 4028 Monomer | 0 | 30 |
| SR602 Monomer | 57% | 0 |
| CD9038 Monomer | 0 | 32% |
| V-Cap/RC Monomer | 5% | 5% |
| Lucirin TPO | 1.5% | 1.5% |
| Irgacure 184 | 1.5% | 1.5% |
| Irganox 1035 | 0.5 pph | 0 |
| Irganox 1076 | 0 | 0.5 pph |
| TegoRad 2250 | 0.5 pph | 1.0 pph |

TABLE 5

Weight Percentages for Matrix Components

| Component | Inner Matrix Example 2 | Inner Matrix Example 3 | Outer Matrix Example 2 | Outer Matrix Example 3 |
|---|---|---|---|---|
| Photomer 3016 Monomer | 35% | 35% | 25% | 20% |
| SR602 Monomer | 62% | 63.5% | 72% | 77% |
| CD9038 Monomer | 0 | 0 | 0 | 0 |
| SR9003 | 0 | 0 | 0 | 0 |
| V-Cap/RC Monomer | 0 | 0 | 0 | |
| Lucirin TPO | 1.5% | 1.5% | 1.5% | 1.5% |
| Irgacure 184 | 1.5% | 0 | 1.5% | 1.5% |
| Irganox 1035 | 0.5 pph | 0.5 pph | 0 | 0 |
| Irganox 1076 | 0 | 0 | 0.5 pph | 0.5 pph |
| TegoRad 2250 | 0.5 pph | 0.5 pph | 1.0 pph | 1.0 pph |

In the exemplary matrix formulation summarized in Table 4, the aggregate monomer component for the inner matrix component comprises about 97 weight percent of the inner matrix material. The aggregate monomer component for the outer matrix material also comprises about 97 weight percent of the inner matrix material.

Photomer 3016 is a high viscosity bisphenol A-based epoxy diacrylate monomer available from Cognis Corporation. Photomer 4028 is ethoxylated$_{(4)}$ bisphenol A diacrylate monomer available from Cognis Corporation. SR602 is ethoxylated$_{(10)}$ bisphenol A diacrylate monomer available from Sartomer. CD9038 is ethoxylated$_{(30)}$ bisphenol A diacrylate monomer available from Sartomer. V-Cap/RC is n-vinyl caprolactam available from ISP Corporation. Lucirin TPO is 2,4,6-Trimethyldiphenylphosphineoxide available from BASF Corporation. Irgacure 184 is 1-Hydroxycyclohexyl phenylketone available from Ciba. Irganox 1035 is 3,5-bis(1,1-dimethylethyl)-4-hydroxy-thiodi-2,1-ethanediyl ester available from Ciba. Irganox 1076 is 3,5-bis(1,1-dimethylethyl)-4-hydroxy-octadecyl ester available from Ciba. TegoRad 2250 is Silicone polyether acrylate available from Degussa.

Figure 4:
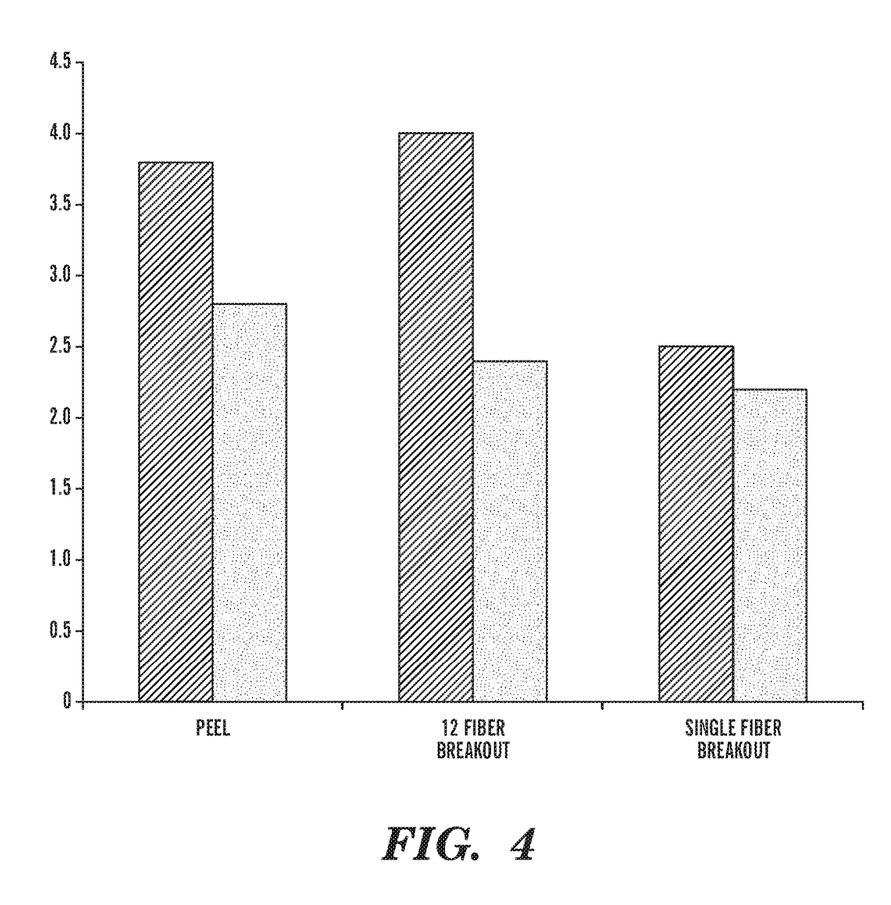
FIG. 4 summarizes breakout and peel performance of matrix materials according to the present embodiments compared with a conventional formulation.

The optical fiber ribbon 10 constructed with a matrix 30 using the inner and outer matrix compositions described in Table 4 had favorable peel and breakout performance. The peel and breakout performance is summarized in FIG. 4. A conventional control ribbon was also tested for comparison purposes. The control ribbon was made using commercially available matrix materials based on urethane acrylate oligomers. The data illustrated in FIG. 4 was generated from 12 fiber ribbons made according to Corning Cable Systems standard process for ribbon manufacturing. Control ribbons were made using the comparative matrix materials currently in use at CCS. These matrix materials are purchased from DSM Desotech. The inner matrix layer is 950-706 and the outer matrix layer is 9D9-518. The ribbons in accordance with the present invention were made using the RP11 inner matrix formulation and the RS81 outer matrix formulation described in Table 4. The ribbons were then subjected to peel and breakout testing, the procedures for which are detailed below. For each test, the test data for the control ribbons are shown to the left, and the test data for the present formulation are shown to the right. The ribbons according to the present embodiments had better peel and breakout ratings than the control ribbons, at a significant cost reduction. Without being bound by theory, the improved breakout and peel performance is believed to be due to enhanced toughness of the present matrix materials due to the use of bisphenol A-based monomers. The rigid bisphenol A groups are thought to provide enhanced toughness via a yielding mechanism and is consistent with reports for thermally crosslinked epoxy networks in which the presence of a yielding mechanism was found to increase toughness.

The matrix materials according to the present embodiments are not limited to the specific compositions shown above. For example, inner matrix materials could be derived using the same components as the outer matrix but at different ratios in order to adjust physical properties to be in the desired ranges for inner matrix materials. Likewise, outer matrix materials could be derived using the same components as the inner matrix but at different ratios in order to adjust physical properties to be in the desired ranges for inner matrix materials.

The foregoing describes various embodiments that are given here by way of example only. Although matrix materials have been described with reference to preferred embodiments and examples thereof, other embodiments may perform similar functions and/or achieve similar results. Such equivalent embodiments and examples are intended to be covered by the appended claims.

We claim:

1. An optical fiber ribbon, comprising: a plurality of optical fibers; and a ribbon matrix comprising an inner matrix surrounding and encapsulating the optical fibers, wherein the inner matrix is the cured product of an inner matrix composition substantially free of oligomer components; and an outer matrix surrounding the inner matrix, wherein the outer matrix is the cured product of an outer matrix composition substantially free of oligomer components; wherein the inner or outer matrix comprising: at least one monomeric component present in an aggregate amount of 80 weight percent or more, wherein an aggregate oligomeric component of the matrix composition is 3 weight percent or less, wherein the at least one monomeric component comprises ethoxylated(10)bisphenol-A diacrylate monomer present in an amount of 50-65 weight percent and epoxy diacrylate monomer present in an amount of 30-40 weight percent.

2. The composition of claim 1, wherein the at least one monomeric component is present in an aggregate amount of 85 weight percent or more, and wherein the aggregate oligomeric component is about 2 weight percent or less.

3. The composition of claim 1, wherein the at least one monomeric component is present in an aggregate amount of 90 weight percent or more, and wherein the aggregate oligomeric component is 1 weight percent or less.

4. The composition of claim 1, wherein the at least one monomeric component is present in an aggregate amount of 95 weight percent or more.

5. The composition of claim 1, wherein the at least one monomeric component is present in an aggregate amount of 97 weight percent or more.

6. The optical fiber ribbon of claim 1, wherein each of the plurality of optical fibers includes a glass fiber having a coating layer, and the inner matrix surrounds the coating layer of each of the plurality of optical fibers.

7. The optical fiber ribbon of claim 6, wherein the inner matrix composition is different than the outer matrix composition.

* * * * *